US010710453B2

(12) United States Patent
Ryman et al.

(10) Patent No.: US 10,710,453 B2
(45) Date of Patent: Jul. 14, 2020

(54) PUMPLESS TRANSFER CASE FOR DISCONNECT AXLES (71) Applicant: Magna Powertrain of America, Inc., Troy, MI (US)

(72) Inventors: Devin P. Ryman, Macomb, MI (US); Timothy J. Filkins, Auburn Hills, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 417 days.

(21) Appl. No.: 15/547,584

(22) PCT Filed: Feb. 23, 2016

(86) PCT No.: PCT/US2016/019029
§ 371 (c)(1),
(2) Date: Jul. 31, 2017

(87) PCT Pub. No.: WO2016/137924
PCT Pub. Date: Sep. 1, 2016

(65) Prior Publication Data
US 2018/0264939 A1 Sep. 20, 2018

Related U.S. Application Data (60) Provisional application No. 62/120,405, filed on Feb. 25, 2015.

(51) Int. Cl.
*B60K 17/344* (2006.01)
*F16H 57/04* (2010.01)
(Continued)

(52) U.S. Cl.
CPC ........ *B60K 17/344* (2013.01); *B60K 23/0808* (2013.01); *F16D 13/52* (2013.01);
(Continued)

(58) Field of Classification Search
CPC .. F16H 57/029; F16H 57/035; F16H 57/0434; B60K 17/344
See application file for complete search history.

(56) References Cited

U.S. PATENT DOCUMENTS 5,346,442 A * 9/1994 Eastman .............. B60K 17/344
192/53.341
5,400,866 A * 3/1995 Wilson ................ B60K 17/344
180/197

(Continued)

FOREIGN PATENT DOCUMENTS

| GB | 2408082 A | 5/2005 |
|---|---|---|
| GB | 2455198 A | 6/2009 |
| WO | WO2011068949 A1 | 6/2011 |

OTHER PUBLICATIONS

International Search Report and Written Opinion dated May 19, 2016 from International Patent Application Serial No. PCT/US2016/019029.

*Primary Examiner* — Terence Boes
(74) *Attorney, Agent, or Firm* — Dickinson Wright PLLC (57) ABSTRACT

A transfer case for a four-wheel drive vehicle having a disconnectable secondary axle assembly. The transfer case is configured to include a pumpless lubrication sump maintained in relation to a mainshaft for lubricating rotary components surrounding the mainshaft.

16 Claims, 7 Drawing Sheets

(51) Int. Cl.

| | | |
|---|---|---|
| *B60K 23/08* | (2006.01) | |
| *F16D 13/52* | (2006.01) | |
| *F16D 23/12* | (2006.01) | |
| *F16H 57/021* | (2012.01) | |
| *F16H 57/029* | (2012.01) | |
| *F16H 57/035* | (2012.01) | |
| *F16H 57/05* | (2006.01) | |

(52) U.S. Cl.
CPC ........... *F16D 23/12* (2013.01); *F16H 57/021* (2013.01); *F16H 57/029* (2013.01); *F16H 57/035* (2013.01); *F16H 57/04* (2013.01); *F16H 57/0452* (2013.01); *F16H 57/0457* (2013.01); *F16H 57/0473* (2013.01); *F16H 57/05* (2013.01); *F16D 2023/123* (2013.01)

(56) References Cited

U.S. PATENT DOCUMENTS

| | | |
|---|---|---|
| 8,650,980 B2 | 2/2014 | Lafer et al. |
| 8,776,950 B2 | 7/2014 | Quehenberger et al. |
| 2002/0086763 A1* | 7/2002 | Kobayashi ........... B60K 17/344 475/198 |
| 2006/0100053 A1* | 5/2006 | Asahi .................... F16H 57/029 475/221 |
| 2008/0113843 A1* | 5/2008 | Kenmotsu ............. B60K 17/34 475/222 |
| 2009/0321208 A1 | 12/2009 | Schrand et al. |
| 2016/0160713 A1* | 6/2016 | Reedy ...................... F01M 1/02 184/6.28 |
| 2017/0292570 A1* | 10/2017 | Ketchel .................... F16D 3/223 |
| 2017/0368933 A1* | 12/2017 | Drill ...................... F16H 57/035 |
| 2019/0061524 A1* | 2/2019 | Nozu ................. B60K 23/0808 |

\* cited by examiner

PUMPLESS TRANSFER CASE FOR DISCONNECT AXLES

CROSS-REFERENCE TO RELATED APPLICATIONS

This application claims the benefit of U.S. Provisional Application No. 62/120,405 filed on Feb. 25, 2015. The entire disclosure of the above application is incorporated herein by reference.

FIELD

The present disclosure relates generally to transfer cases for use in four-wheel drive motor vehicles. More particularly, the present disclosure relates to a pumpless lubrication system for a transfer case configured to provide an elevated sump of lubricating fluid surrounding the mainshaft.

BACKGROUND

This section provides background information related to the present disclosure which is not necessarily prior art.

In many four-wheel drive vehicles, a transfer case is installed in the drivetrain between the primary (i.e. rear) driveline and the secondary (i.e. front) driveline and is operable for selectively and/or automatically transmitting drive torque generated by the powertrain to all four wheels so as to provide a four-wheel drive (4WD) mode of operation in addition to a two-wheel drive (2WD) mode of operation. In some transfer cases, a mode shift system permits the vehicle operator to selectively shift between the 2WD mode wherein all drive torque is transmitted to the primary wheels via the primary driveline and a "part-time" or locked 4WD mode wherein a dog clutch rigidly interconnects the secondary driveline to the primary driveline. As an alternative, the positive-locking dog clutch may be replaced with a torque transfer coupling that is configure to provide automatic or adaptive control over the amount of drive torque transferred to the secondary driveline so as to define an "on-demand" 4WD mode. Typically, the torque transfer coupling includes a multi-plate friction clutch and a power-operated clutch actuator that is controlled by a traction control system in response to certain vehicle operating conditions (i.e. vehicle speed, acceleration rate, steering angle, braking status, etc.) for varying a clutch engagement force applied to the friction clutch which, in turn, varies the drive torque distribution between the primary and secondary drivelines.

In a large majority of modern transfer cases, the dog clutch or the friction clutch, hereinafter cumulatively referred to as the "mode" clutch, is operably arranged to surround a primary axis defined by the mainshaft which interconnects an output of the powertrain to an input of the primary driveline. The front output shaft is rotatable about a secondary axis that is offset from the primary axis. A transfer assembly, such as a chain drive assembly, is connected to the front output shaft and the mode clutch is operable to selectively/automatically couple the transfer assembly to the mainshaft so as to transfer drive torque to the front output shaft. Typically, a sump of lubricant is provide in proximity to the secondary axis and means are also provided for pumping the lubricant from the sump to the mainshaft so as to lubricate the bearings and other rotary components associated with the transfer assembly and the mode clutch.

In some transfer cases, a shaft-driven lube pump such as, a gear pump or gerotor pump, is associated with the mainshaft for pumping lubricant from the sump in response to rotation of the mainshaft. In some other transfer cases, a pumpless lubrication system is employed to convey the lubricant upwardly from the sump toward the mainshaft without the use of a lube pump. For example, U.S. Pat. No. 8,650,980 discloses a transfer case equipped with a pumpless lubrication system which utilizes the rotation of the gear-type transfer assembly to provide the fluid pumping action.

It is also known to disconnect the secondary driveline when the motor vehicle is operating in its 2WD mode to prevent the secondary wheels from "back-driving" the secondary driveline in an effort to reduce parasitic drag and improve fuel economy. Most commonly, a disconnect coupling is installed in the secondary axle assembly between the secondary wheels and the secondary differential unit. The disconnect system can include a pair of hub disconnect couplings associated with the secondary wheel or a shaft disconnect coupling disposed between two shaft segments of an axleshaft. Examples of dog-type and multi-plate disconnect couplings are shown in U.S. Publication No. US2009/0321208. In four-wheel drive vehicles equipped with such secondary driveline disconnect systems, the front output shaft and the transfer assembly within the transfer case are not driven during operation in the 2WD mode.

However, a need exists to still provide means for pumping lubricant from the sump to the mainshaft for lubrication of the mode clutch as well as the bearings supporting other rotary components on the mainshaft when the mode clutch is released and the vehicle is operating in its 2WD mode. Since lubricant is not conveyed by the transfer assembly, such transfer cases typically include the previously noted shaft-driven gerotor lube pump or, in the alternative, an electrically-driven lube pump for providing on-demand lubrication. As an alternative, a pumpless transfer case lubrication system is disclosed in U.S. Pat. No. 8,776,950 which is configured to periodically actuate the on-demand mode clutch when the secondary axle assembly is disconnected so as to drive the transfer assembly for use as the lubricant conveying device.

In view of the above, it is recognized that a need exists to continue development of pumpless transfer cases for use in four-wheel drive vehicles equipped with a disconnectable secondary driveline.

SUMMARY OF THE INVENTION

This section provides a general summary of the disclosure and is not intended to be a comprehensive disclosure of all features, advantages, aspects and objectives associated with the inventive concepts described in the detailed description provided herein and illustrated in the accompanying drawings.

It is an aspect of the present disclosure to provide a transfer case for use in a four-wheel drive motor vehicle equipped with a pumpless lubrication system.

It is a related aspect of the present disclosure to provide such as a pumpless transfer case for use in a four-wheel drive motor vehicle having a disconnectable secondary driveline.

It is another related aspect of the present disclosure to provide the pumpless transfer case with a primary lubricant sump associated with a primary rotary axis and a secondary lubricant sump associated with a secondary rotary axis, and wherein the primary sump is elevated with respect to the secondary sump.

In accordance with these and other aspects and objectives of the present disclosure, a transfer case is provided having a first shaft interconnecting an output of the powertrain to a primary driveline, a second shaft interconnected to a secondary driveline, a transfer assembly coupled to the second shaft and located within a transfer assembly chamber, and a transfer clutch operable for selectively/automatically coupling the transfer assembly to the first shaft. The transfer case is configured such that the first shaft and the transfer clutch are disposed to surround a first rotary axis that is elevated with respect to a second rotary axis about which the second shaft rotates. Furthermore, a pumpless lubrication system is provided wherein at least one elevated lubricant sump is associated with the first axis and is sealingly delineated with respect to a lower lubricant sump provided in the transfer assembly chamber. The lubricant retained in the at least one elevated lubricant sump is used for lubricating the transfer clutch and other rotary components surrounding the first shaft.

Further areas of applicability will become apparent from the detailed description provided herein. As noted, the description and example embodiments disclosed in the above summary are intended for purpose of illustration only and are not intended to limit the scope of the present disclosure.

DRAWINGS

The drawings described herein are only for purposes of illustrating selected example embodiments and not all possible implementation thereof, such that the drawings are not intended to limit the scope of the inventive concept associated with the present disclosure.

Corresponding reference numerals are used throughout the several views shown in the drawings to indicate corresponding components and/or elements.

DETAILED DESCRIPTION

Example embodiments of a transfer case for use in a four-wheel drive motor vehicle of the type having a disconnectable secondary driveline will now be described more fully with reference to the accompanying drawings. More specifically, example embodiments of transfer cases equipped with a pumpless lubrication system will now be described to clearly identify the inventive concepts provided by the present disclosure. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order or sequence of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" Includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
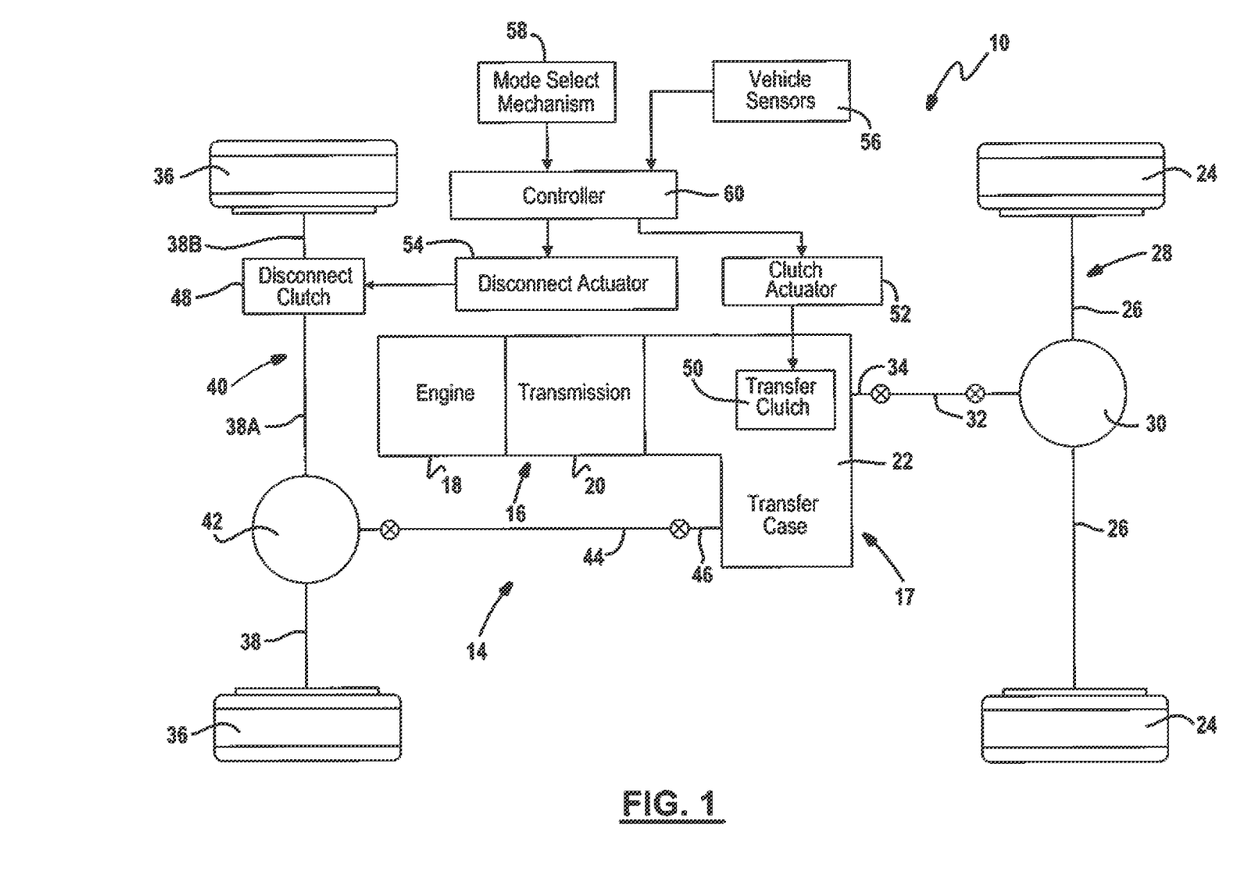
FIG. 1 schematically illustrates a drivetrain of a four-wheel drive motor vehicle equipped with a transfer case that is constructed and operable in accordance with the teachings of the present disclosure.

With particular reference to FIG. 1 of the drawings, a drivetrain 10 for a four-wheel drive motor vehicle is shown. Drivetrain 10 includes a primary driveline 12, a secondary driveline 14, a powertrain 16 for generating rotary power (i.e. drive torque), and a power divider 17 configured to transmit the rotary power generated by powertrain 16 to primary driveline 12 and secondary driveline 14. In the particular arrangement shown, primary driveline 12 is the rear driveline while secondary driveline 14 is the front driveline. Powertrain 16 includes an engine 18 and a transmission 20 while power divider 17 is shown configured as a transfer case 22. Rear driveline 12 includes a pair of rear wheels 24 connected to rear axleshafts 26 of a rear axle assembly 28 which has a rear differential unit 30 drivingly connected to rear axleshafts 26. Rear driveline 12 also includes a rear propshaft 32 having a first end drivingly connect to rear differential unit 30 via a hypoid gearset (not shown) and a second end drivingly connected to a rear output shaft or mainshaft 34 of transfer case 22.

Front driveline 14 includes a pair of front wheels 36 connected to front axleshafts 38 of a front axle assembly 40 which has a front differential unit 42 drivingly connected to front axleshafts 38. Front driveline 14 also includes a front propshaft 44 having a first end drivingly connected to front differential unit 42 via a hypoid gearset (not shown) and a second end drivingly connected to a front output shaft 46 of transfer case 22. Front axle assembly 40 is of the "disconnectable" type and is shown to include a disconnect clutch 48 operably installed between shaft segments 38A, 38B of one of front axleshafts 38.

With continued reference to FIG. 1 of the drawings, drivetrain 10 is further shown to include an electronically-controlled power transfer system configured to permit a vehicle operator to select between a two-wheel drive (2WD) mode, a part-time or "locked" four-wheel drive (LOCK-4WD) mode, and an adaptive or "on-demand" four-wheel drive (AUTO-4WD) mode. In this regard, transfer case 22 is equipped with a transfer clutch 50 that can be selectively actuated for transferring drive torque from mainshaft 34 to front output shaft 46 for establishing the LOCK-4WD and AUTO-4WD modes of operation. The power transfer system further includes a power-operated clutch actuator 52 for controlling actuation of transfer clutch 50, a power-operated disconnect actuator 54 for controlling actuation of disconnect clutch 48, a plurality of vehicle sensors 56 for detecting certain dynamic and operational characteristics of the motor vehicle, a mode selector 58 for permitting the vehicle operator to select one of the available drive modes, and a controller unit 60 for controlling coordinated actuation of actuators 52, 54 in response to input signals from vehicle sensors 56 and a mode signal from mode selector 58.

To establish the 2WD mode, clutch actuator 52 is controlled to shift transfer clutch 50 into a "released" mode while disconnect actuator 54 is controlled to shift disconnect clutch 48 into a "disconnected" mode. With transfer clutch 50 in its release mode, no drive torque is transmitted through transfer clutch 50 to front output shaft 46 such that all drive torque from powertrain 16 is delivered to rear wheels 24 via rear driveline 12. With disconnect clutch 48 in its disconnected mode, axleshaft segments 38A, 38B are disconnected such that rotation of front wheels 36 during motive operation of the vehicle does not cause front propshaft 44 and front output shaft 46 to be back-driven.

To establish the lock-4WD mode, disconnect actuator 54 is controlled to shift disconnect clutch 48 into a "connected" mode and clutch actuator 52 is controlled to shift transfer clutch 50 into a "fully-engaged" mode. With transfer clutch 50 operating in its fully-engaged mode, mainshaft 34 is, in effect, positively coupled to front output shaft 46 such that the drive torque from powertrain 16 is equally distributed therebetween. With disconnect clutch 48 in its connected mode, shaft segments 38A, 38B are drivingly connected such that drive torque delivered to front output shaft 46 is transferred via front driveline 14 to front wheels 36.

To establish the AUTO-4WD mode, disconnect clutch 48 is shifted into or maintained in its connected mode and clutch actuator 52 operates to adaptively regulate the drive torque distribution ratio between mainshaft 34 and front output shaft 46 by varying operation of transfer clutch 50 between its released and fully-engaged modes. The desired distribution ratio is based on and determined by control logic associated with controller unit 60 and which is configured to determine a desired amount of the total drive torque to be transferred to front output shaft 46 based on the operating characteristic and/or road conditions detected by sensors 56.

Figure 2:
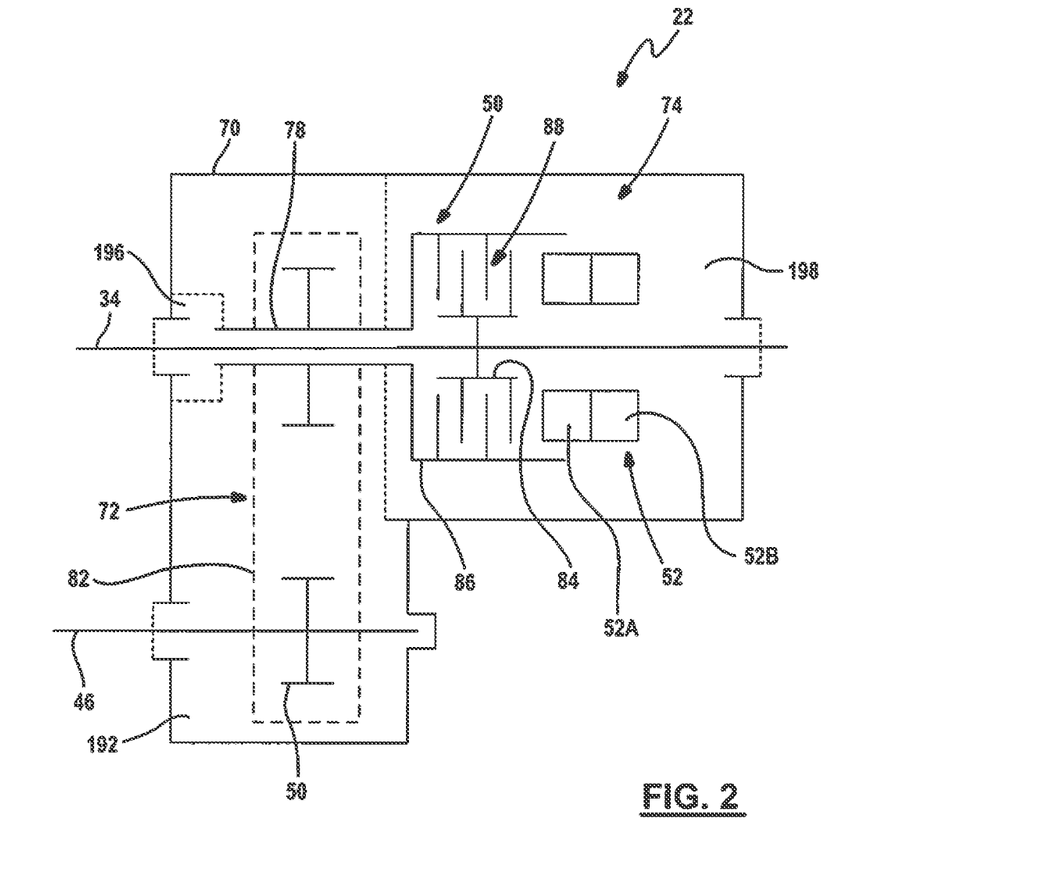
FIG. 2 is a schematic view of a transfer case adapted for use in the four-wheel drive vehicle of FIG. 1 and embodying the teaching of the present disclosure.

FIG. 2 illustrates a schematic one-speed version of transfer case 22 shown in FIG. 1. Transfer case 22 is shown to include a housing assembly 70 rotatably supporting mainshaft 34 and front output shaft 46, a transfer assembly 72, and a clutch unit 74. Transfer assembly 72 is shown, in this non-limiting example, as a chain and sprocket arrangement having a first sprocket 76 fixed to a tubular stub shaft defining a sprocket tube 78 that is rotatably mounted on an intermediate portion of mainshaft 34, a second sprocket 80 fixed to front output shaft 46, and an endless power chain 82 encircling first sprocket 76 and second sprocket 80. Alternatively, transfer assembly 72 could be configured as a geared drive arrangement having a first gear fixed to sprocket tube 78, a second gear fixed to front output shaft 46, and an idler gear in constant mesh with the first and second gears. Clutch unit 74 generally includes transfer clutch 50 and power-operated clutch actuator 52. Transfer clutch 50, in this non-limiting arrangement, includes a first clutch member or clutch hub 84 fixed to mainshaft 34, a second clutch member or clutch drum 86 fixed to sprocket tube 78, and a multi-plate clutch pack 88 comprised of a plurality of interdigitated first and second friction plates. The first friction plates are splined for rotation with clutch hub 84 while the second friction plates are splined for rotation with clutch drum 86.

Power-operated clutch actuator 52 is schematically shown in proximity to clutch pack 88 and is configured and operable to include a moveable actuation component that is adapted to exert a compressive clutch engagement force on clutch pack 88. As will be detailed, movement of this actuation component in an engagement direction (i.e. toward clutch pack 88) increases the magnitude of the clutch engagement force and the corresponding amount of drive torque transferred from mainshaft 34 to front output shaft 46 via transfer clutch 50 and transfer assembly 72. Likewise, movement of the actuation component in a releasing direction (i.e. away from clutch pack 88) decreases the magnitude of the clutch engagement force and the corresponding amount of drive torque transmitted from mainshaft 34 to front output shaft 46 via transfer clutch 50 and transfer assembly 72. Clutch actuator 52 is shown to generally include two components, namely a pressure plate 52A and a powered driver 52B. Pressure plate 52A is axially moveable relative to clutch pack 88 while powered driver 52B is operable to cause and control such axial movement of pressure plate 52A. Powered driver 52B can include any of the following without limitations, a motor-driven ball ramp unit, a motor-driven cam unit, a motor-driven linear actuator unit, an electromagnetically-actuated ball ramp or cam unit, and a hydraulic power pack (i.e. motor-driven fluid pump).

As will be detailed, the present disclosure is directed to configuring transfer case 22 to locate mainshaft 34 and transfer clutch 50 for rotation about a first rotary axis that is elevated with respect to a second rotary axis about which front output shaft 46 rotates. In association with this configuration, transfer case 22 further includes a "pumpless" lubrication system arranged to establish at least one elevated lubricant sump in association with the first rotary axis and which is sealingly delineated with respect to a lower lubricant sump associated with the second rotary axis. Furthermore, lubricant retained in the at least one elevated lubricant sumps is used for lubricating transfer clutch 50 and other rotary components surrounding mainshaft 34.

FIG. 2 schematically illustrates transfer case 22 configured to define a first elevated sump chamber 196 and a second elevated sump chamber 198, both of which are sealed relative to a transfer assembly sump chamber 192. Accordingly, a first primary lubricant sump is maintained in first sump chamber 196 and a second primary lubricant sump is maintained in second sump chamber 198 while a secondary lubricant sump is maintained in transfer assembly sump chamber 192. The first and second primary lubricant sumps are associated with the first rotary axis about which mainshaft 34 rotates while the secondary lubricant sump is associated with the second rotary axis about which front output shaft 46 rotates.

Figure 3:
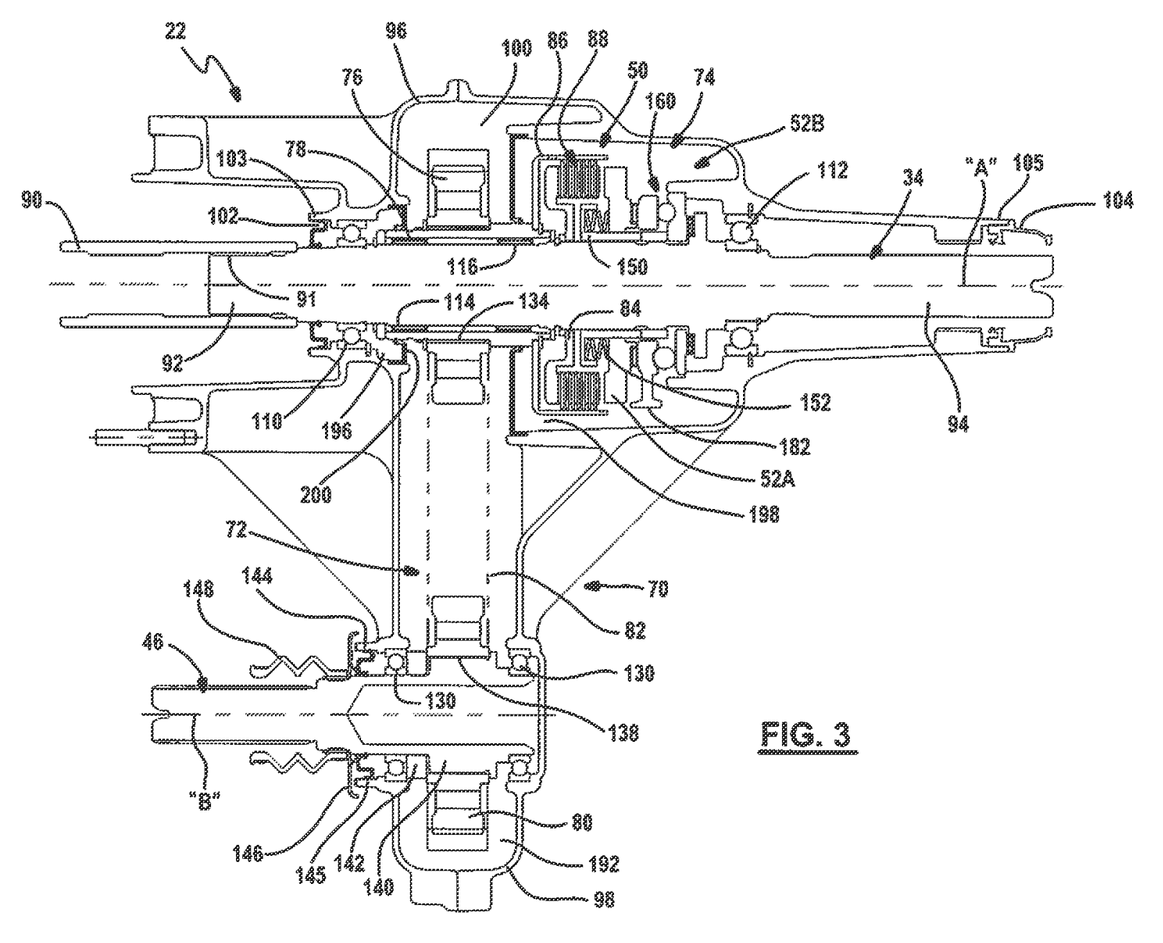
FIG. 3 is a sectional view of the transfer case of the present disclosure having a pumpless lubrication system.
Figure 4:
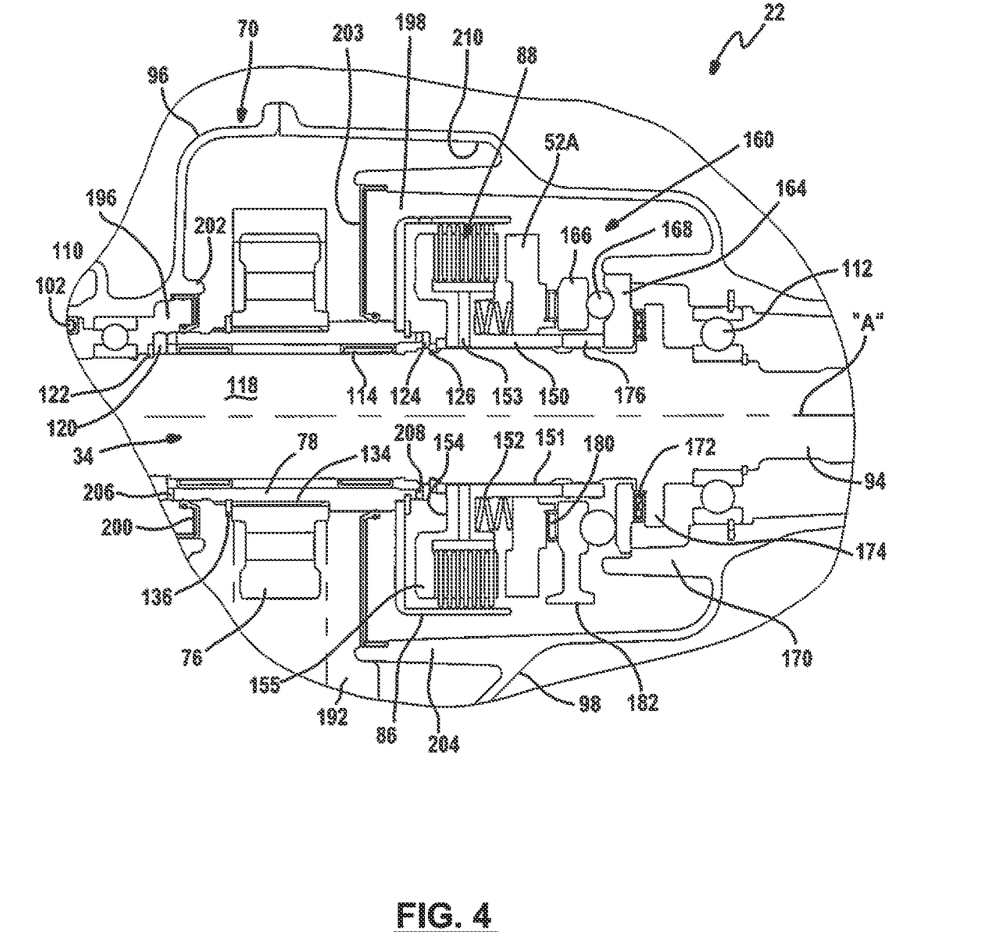
FIG. 4 is an enlarged partial view of the transfer case shown in FIG. 3.

Referring now to FIGS. 3 and 4, a detailed, non-limiting embodiment of transfer case 22 is shown with mainshaft 34 aligned for rotation about a primary or first rotary axis "A" while front output shaft 46 is shown aligned for rotation about a secondary or second rotary axis "B." Second axis B is parallel but offset relative to first axis A such that first axis A is elevated relative to second axis B when transfer case 22 is installed in the motor vehicle. An output shaft 90 of transmission 20 is shown drivingly connected via a splined connection 91 to a first end segment 92 of mainshaft 34. While not shown, a female coupling member is adapted to drivingly connect a second end segment 94 of mainshaft 34 to rear propshaft 32. Housing assembly 70 is shown as a multi-piece housing assembly having a first housing 96 and second housing 98 that are suitably interconnected to define an internal cavity 100. Internal cavity 100 extends between a first rotary seal unit 102 and a second rotary seal unit 104. First rotary seal unit 102 is shown disposed between a cylindrical boss segment 103 of first housing 96 and an outer surface on first end segment 92 of mainshaft 34. Likewise, second rotary seal unit 104 is adapted to be disposed between a cylindrical boss segment 105 of second housing 98 and an end portion of rear propshaft 32 (or the female coupling interconnecting mainshaft 34 to rear propshaft 32).

Transfer case 22 is also shown in FIGS. 3 and 4 to include a pair of laterally-spaced roller bearing assemblies 110, 112 arranged for rotatably supporting mainshaft 34 within housing 70 for rotation about the first axis A. Sprocket tube 78 is rotatably supported by a pair of laterally-spaced needle bearing assemblies 114, 116 on an intermediate segment 118 of mainshaft 34 for rotation about the first axis A. A first thrust ring 120 and a first retainer ring 122 are located at one end of sprocket tube 78 while a second thrust ring 124 and a secondary retainer ring 126 are located at the opposite end of sprocket tube 78. These components cooperate to axially locate and retain sprocket tube 78 on intermediate segment 118 of mainshaft 34. Finally, a pair of laterally-spaced roller bearing assemblies 130 are provided for rotatably supporting front output shaft 46 within housing assembly 70 for rotation about the second axis B.

Transfer assembly 72 is shown to include first sprocket 76 which is fixed via a splined connection 134 to an outer surface of sprocket tube 78 for rotation about the first axis A. A retainer clip 136 axially positions and retains first sprocket 76 on sprocket tube 78. Second sprocket 80 is fixed via a splined connection 138 to a raised hub segment 140 of front output shaft 46 for rotation about the second axis B. A lock ring 142 axially positions and retains second sprocket 80 on raised hub segment 140 of front output shaft 46. A third rotary seal unit 144 is shown disposed between a cylindrical boss segment 145 formed on first housing 96 and an outer surface of front output shaft 46. A dirt deflector 146 and a resilient boot 148 are attached for rotation with front output shaft 46. Boot 148 is part of a sliding splined coupling unit that is provided between front output shaft 46 and the first end portion of front propshaft 44 (or a coupling operably interconnecting front propshaft 44 to front output shaft 46). It will be appreciated that the sprocket and chain type of transfer assembly 72 can be replaced with a geared type of transfer assembly within the scope of the present disclosure.

In the non-limiting embodiment of transfer case 22 shown in FIGS. 3 and 4, transfer clutch 50 is shown arranged to surround mainshaft 34 on the first axis with clutch drum 86 fixed for rotation with sprocket tube 78 and clutch hub 84 fixed for rotation with mainshaft 34. In particular, clutch hub 84 includes an axially-extending sleeve segment 150 that is fixed via a splined connection 151 to mainshaft 34, a radially-extending web segment 154, and a reaction plate segment 155. Pressure plate 52A of clutch actuator 52 is shown slideably mounted on sleeve segment 150 for surrounding mainshaft 34. A return spring 152 is arranged between web segment 154 of clutch hub 84 and pressure plate 52A for normally biasing pressure plate 52A in the releasing direction (to the right in the drawings) away from clutch pack 88.

Figure 5:
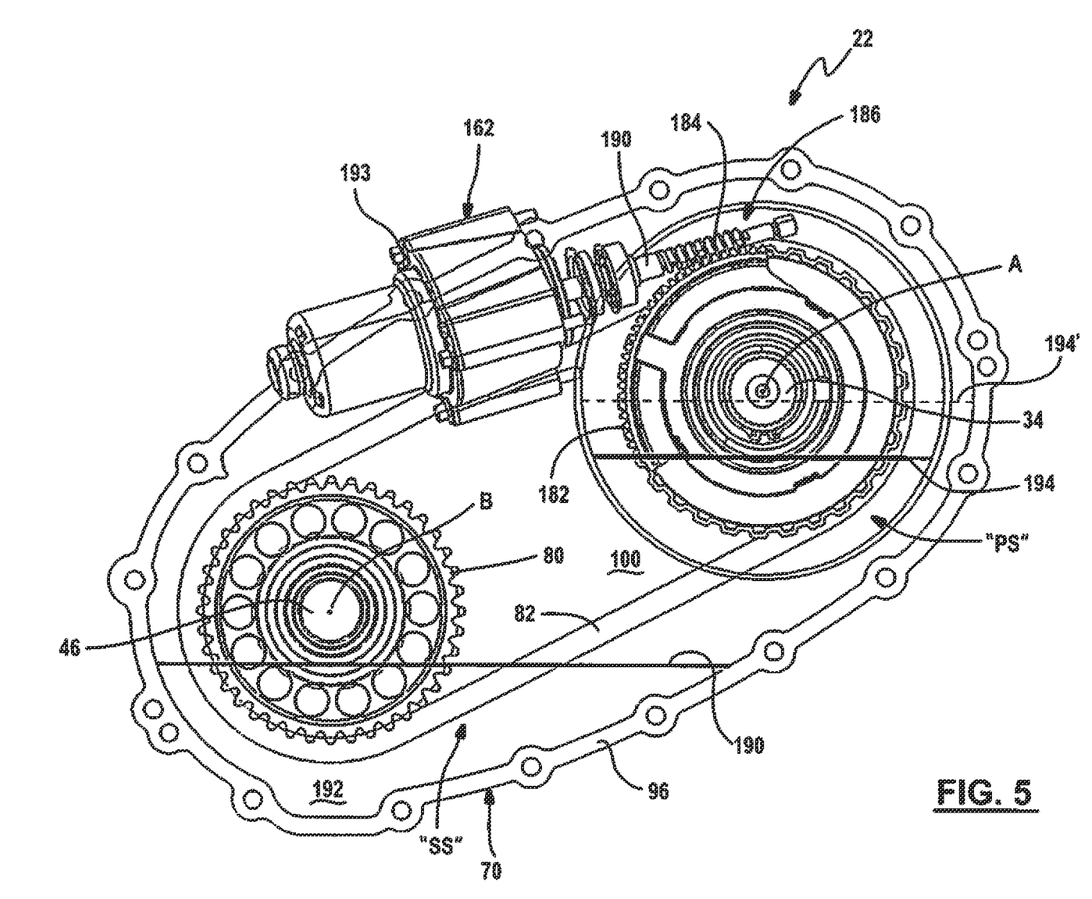
FIG. 5 is a side view of the transfer case shown in FIG. 3 and illustrating the lubricant sump position and fill levels associated with a primary lubricant sump and a secondary lubricant sump.

Powered driver 52B of clutch actuator 52 is a motor-driven ball ramp assembly which includes a ball ramp unit 160 and an electric motor 162 (see FIG. 5). Ball ramp unit 160 includes a stationary first cam ring 164, a moveable second cam ring 166, and rollers 168 aligned in cam surfaces formed in one or both of cam rings 164, 166. First cam ring 164 is non-rotatably fixed to a cylindrical rim segment 170 of second housing 98. A thrust bearing assembly 172 is disposed between first cam ring 164 and a backing ring segment 174 on mainshaft 34. A locator sleeve 176 is disposed between sleeve segment 150 of clutch hub 84 and first cam ring 164 to axial locate and retain first cam ring 164. Second cam ring 166 surrounds locator sleeve 176 and a thrust bearing unit 180 is shown disposed between second cam ring 166 and pressure plate 52A. A sector gear 182 is formed on an extended portion of second cam ring 166. As best shown in FIG. 5, threads of a worm 184 are meshed with gear teeth of sector gear 182 to define a reduction gearset 186. Worm 184 is driven by an output shaft 190 of electric motor 162. Motor 162 is secured, such as by fasteners 193, to a portion of one of first housing 96 and second housing 98 of housing assembly 70.

Rotation of worm 184 in a first direction causes rotation of second cam ring 166 in a first rotary direction which, in turn, causes corresponding axial movement of second cam ring 166 in a first axial direction (right in drawings) to permit biasing spring 152 to move pressure plate 52A in its releasing direction for disengaging clutch pack 88 and placing transfer clutch 50 in its released mode. In contrast, rotation of worm 184 in a second direction causes rotation of second cam ring 166 in a second rotary direction which, in turn, causes corresponding axial movement of second cam ring 166 in a second axial direction (left in the drawings) for forcibly moving pressure plate 52A in an engaging direction and shifting transfer clutch 50 from its released mode into an engaged mode. The configuration of the cam surfaces acts to coordinate the relationship between rotation and axial translation of second cam ring 166 relative to first cam ring 164.

In accordance with the teachings of the present disclosure, transfer case 22 is configured to provide a "pumpless" lubrication system which includes at least one primary lubricant sump "PS" that is separate and distinct from a secondary lubricant sump "SS". The secondary lubricant sump is otherwise conventional and provided in a lower portion of housing assembly 70 to provide a lubricant fill level, as indicated by a lower fill line 190 of FIG. 5, that is generally associated with a lower portion of a transfer assembly or chain sump chamber 192 of internal cavity 100. In contrast, the primary lubricant sump is provided in an upper (i.e. vertically elevated) portion of housing assembly 70 to provide a lubricant level, as indicated by an elevated fill line 194 of FIG. 5, that is generally associated with each of an inlet sump chamber 196 and a clutch sump chamber 198 of internal cavity 100. Hereinafter, the inlet sump chamber can also be referred to as "first" elevated sump chamber 196 while the clutch sump chamber can also be referred to as "second" elevated sump chamber 198.

As best seen from FIG. 4, first elevated sump chamber 196 is defined between first rotary seal unit 102 and a fourth rotary seal unit 200. As disclosed previously, first rotary seal unit 102 is operably disposed between cylindrical boss segment 103 of first housing 96 and an outer surface on first end segment 92 of mainshaft 34. Fourth rotary seal unit 200 is shown to be operably disposed between a cylindrical rim segment 202 of first housing 96 and an outer surface of sprocket tube 78. As such, roller bearing assembly 110 is located within first elevated sump chamber 196. As shown, fourth rotary seal unit 200 delineates and seals first elevated sump chamber 196 with respect to chain sump chamber 192. Fourth rotary seal unit 200 includes a cylindrical rim segment sealingly engaged with rim segment 202 of first housing 96, a radial ring segment connected to the cylindrical rim segment, and a resilient sealing flange segment biased into sealing engagement with the outer surface of sprocket tube 78.

Second elevated sump chamber 198 is defined between second rotary seal unit 104 and a fifth rotary seal unit 203. As previously disclosed, second rotary seal unit 104 is operably disposed between end segment 105 of second housing 98 and the end of rear propshaft 32 (or coupling) that is drivingly connected to second end segment 94 of mainshaft 34. Fifth rotary seal unit 203 is operably disposed between a large diameter cylindrical rim segment 204 of second housing 98 and an outer surface of sprocket tube 78. As such, clutch unit 74 and roller bearing assembly 112 are located within second elevated sump chamber 198. As is shown, fifth rotary seal unit 203 functions to delineate and seal second elevated sump chamber 198 with respect to chain sump chamber 192. Fifth rotary seal unit 203 includes a cylindrical rim segment sealingly engaged with rim segment 204 of second housing 98, an elongated radial ring segment connected to the cylindrical rim segment, and a resilient sealing flange segment biased into sealing engagement with the outer surface of sprocket tube 78.

In accordance with one optional configuration, first and second elevated sump chambers 196, 198 can be isolated so as to inhibit fluid communication therebetween. In such an arrangement, each elevated sump chamber 196, 198 would be filled to an appropriate fill level with lubricant (to elevated fill line 194) and sealed. In accordance with another optional configuration, first and second elevated sump chambers 196, 198 can be in fluid communication to define a continuous elevated sump chamber. Under such a scenario, lubricant can flow between the two elevated sump chambers 196, 198 via one or more fluid flow pathways. In one example configuration, one such fluid flow pathway can be provided in an interface between sprocket tube 78 and intermediate segment 118 of mainshaft 34 such as, for example, around and through needle bearing assemblies 114, 116. In addition, ports 206, 208 can be provided in the ends of sprocket tube 78 to provide such a continuous flow pathway and facilitate conveyance of the lubricant between the interconnected elevated sump chambers 196, 198.

In accordance with this pumpless lubrication system, the components assembled on mainshaft 34 can be lubricated during operation of transfer case 22 in its 2WD mode when transfer assembly 72 is idle (not-rotating) within chain sump chamber 192 since the lubricant in first elevated sump chamber 196 and second elevated sump chamber 198 is maintained at a predefined fill level (line 194) that is selected to provide the required lubrication. While lubricant fill level (line 194) in elevated sump chambers 196, 198 is shown approximately half-way to the first rotary axis, those skilled in the art will appreciate that this is merely intended to illustrate one example of a sump fill level. Another possible example fill line for elevated sump chambers 196, 198 is shown by phantom line 194' to illustrate such an alternative sump fill level arrangement.

Figure 6:
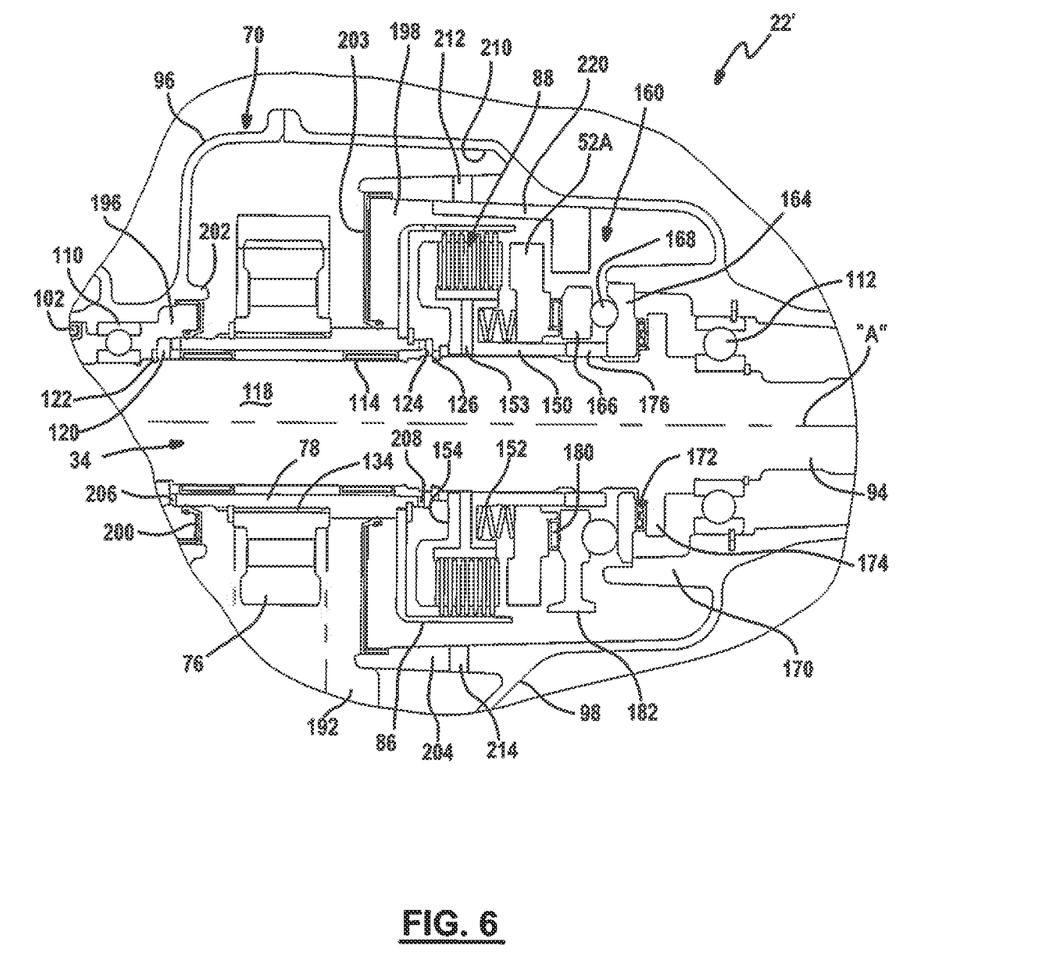
FIG. 6 is a partial sectional view, similar to FIG. 4, but illustrating an alternative embodiment of a transfer case equipped with a pumpless lubrication system in accordance with the present disclosure.

FIG. 6 is generally similar to FIG. 4 with the exception that transfer case 22' is now equipped with a recirculatory type of pumpless lubrication system configured to feed lubricant from chain sump chamber 192 into at least one of first elevated sump chamber 196 and second elevated sump chamber 198. In the example arrangement shown, lubricant conveyed upwardly within chain sump chamber 192 due to rotation of transfer assembly 72 during operation of the motor vehicle in one of the two available 4WD modes is captured in a lubricant collection reservoir 210 formed in second housing 98 above rim segment 204 and is subsequently fed by gravity into second elevated sump chamber 198 via one or more feed ports 212. To prevent second elevated sump chamber 198 from becoming over-filled, one or more discharge ports 214 are also formed in rim segment 204 of second housing 98. It will be understood that feed ports 212 are elevated vertically in comparison to discharge ports 214 when transfer case 22' is installed in the motor vehicle so as to provide a means for maintaining a desired fill level in second elevated sump chamber 198. Accordingly, the vertical location of discharge ports 214 is selected to be slightly above the fill level 194 so as to maintain the desired lubricant supply. A similar lubrication transfer arrangement can be provided between chain sump chamber 192 and first elevated sump chamber 196 in accordance with this disclosure.

Figure 7:
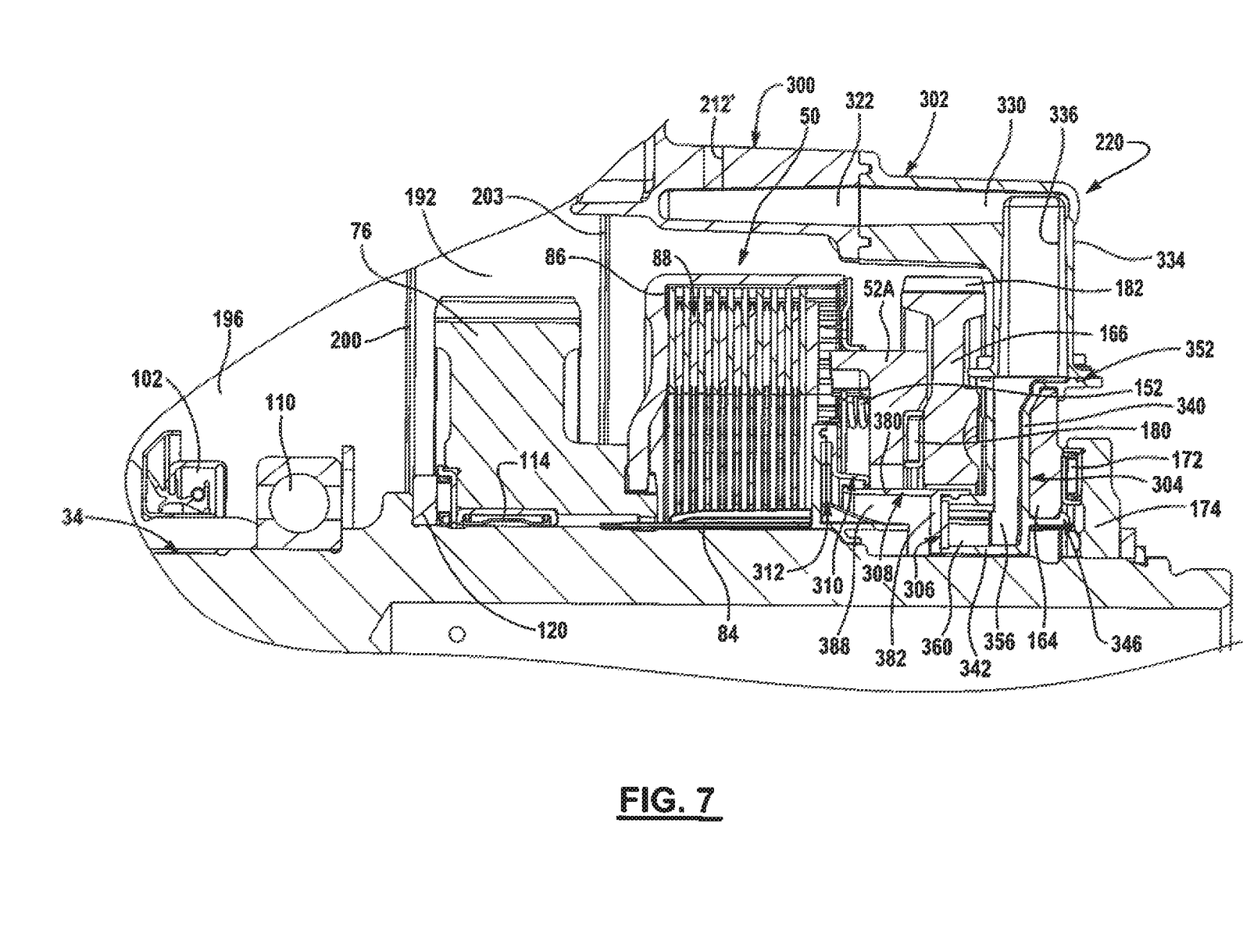
FIG. 7 illustrates a splash lubrication recovery assembly associated with the pumpless lubrication system and the transfer case of FIG. 6

In addition, a lubricant collection and delivery system, schematically shown by box 220, can be installed in transfer case 22' to direct lubricant captured in lubricant collection reservoir 210 (via chain splash and centrifugal action) toward ball ramp unit 160 and transfer clutch 50. Upon discharge from ball ramp unit 160, the lubricant can pass through a flow channel in hub sleeve 150 and be discharged into radial ports 153 formed in web segment 154 for centrifugal delivery to clutch pack 88. FIG. 7 illustrates a non-limiting embodiment of a lubricant collector and delivery system 220 in association with a slightly revised version of transfer case 22' of FIG. 6, identified as transfer case 22A. Common or similar components are identified with reference numerals to those previously described herein. System 220 is an assembly generally comprised of an oil catcher reservoir 300, an oil feed reservoir 302, and oil conduit 304, a flow restrictor ring 306, a clutch flow control device, a clutch feed cover 310, and a clutch feed device. These components are configured and arranged to capture splashed lubricant from chain sump chamber 192 and deliver the collected lubricant into clutch sump chamber 198 for delivery to clutch pack 88. Oil catcher reservoir 300 includes an inlet port 212' from collection sump area 210 into a contoured lubricant catcher channel 322.

Oil catcher reservoir 300 is configured to be sealingly mounted along mating peripheral surfaces to oil feed reservoir 302 such that oil catcher channel 322 is in fluid communication (via one or more flow passages) with an internal oil feed cavity 330 defined within oil feed reservoir 302. Preferably, cavities 322 and 330 are configured to gravity feed lubricant into oil feed cavity 330. Oil feed reservoir 302 is also preferably a molded plastic component and is formed to include a tubular oil feed conduit section 334 having a feed passage 336 configured to communicate with oil feed cavity 330.

Oil conduit 304 includes, in this non-limiting example, a radially-extending web segment 340 and an axially-extending tubular segment 342. Web segment 340 is configured to be installed in a recessed portion 344 of first cam ring 164 and is non-rotatably mounted thereto via a snap-fit connection 346. Web segment 340 terminates in a peripheral mounting flange that is configured to accept and retain a mating mounting flange 352 formed on oil feed conduit section 334 via a snap-fit or slip-fit connection. Web segment 340 includes a flow channel 356 configured to be in direct fluid communication with feed passage 336 of oil feed reservoir 302. Tubular segment 342 of oil conduit 304 surrounds mainshaft 34 and defines a toroidal chamber 360 that is in fluid communication with flow channel 356. Flow restrictor ring 306 is disposed within toroidal chamber 360 and includes a plurality of flow apertures formed therein.

Clutch flow control device 308 is shown, in this non-limiting example, to include a tubular shroud segment 380 and a radial flange segment 382. Clutch flow control device 308 is adapted to move (i.e., rotate) with second cam ring 166 to regulate or meter the flow of lubricant from toroidal chamber 360 of oil conduit 304 into a flow control chamber 388 defined between shroud segment 380 and mainshaft 34. In particular, valve windows are formed in flange segment 382 and can be moved into and out of alignment with flow apertures associated with flow restrictor ring 306 under certain circumstances.

In accordance with one non-limiting arrangement, the valve windows are not aligned with the flow apertures when second cam ring 166 is located in its first position. Thus, when transfer clutch 50 is fully opened, the transmission of lubricant from toroidal chamber 360 into clutch flow control chamber 388 is inhibited, thereby allowing lubricant to continuously fill oil feed cavity 330 in oil feed reservoir 302. In contrast, when second cam ring 166 is located in its second position and transfer clutch 50 is fully engaged, the valve windows are aligned with the flow apertures so as to permit lubricant to feed from toroidal chamber 360 into flow control chamber 388. In this manner, the supply of lubricant to multi-plate clutch pack 88 of transfer clutch 50 can be regulated. Obviously, movement of second cam ring 166 between its first and second positions can be utilized to control a variable amount of overlap and communication between the valve windows and the flow apertures. Preferably, clutch flow control device 308 functions to only rotate in coordination with second cam ring 166 and does not move axially with second cam ring 166 based on a groove and tab type of connection therebetween.

In accordance with the present disclosure, a pumpless lubrication system is provided which relies on lubricant retained in one or more elevated lubricant sumps to provide the required lubrication and cooling of components mounted on a mainshaft and that are rotatable about a primary (elevated) rotary axis. While transfer cases 22, 22 are shown as one-speed on-demand transfer cases, those skilled in the art will understand that two-speed versions thereof having a planetary-type gear reduction unit operably disposed between the transmission output and mainshaft 34 are also with the anticipated scope of the present disclosure. Specifically, rotary components associated with a two-speed reduction unit surrounding mainshaft 34 for rotation about the primary axis can be located within an elevated "gearset" sump chamber that is delineated and sealed relative to the chain sump chamber in a manner similar to elevated sump chambers 196, 198.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transfer case for use in a four-wheel drive motor vehicle having a powertrain and first and second drivelines, the transfer case comprising:

a housing defining an internal cavity;

a first shaft rotatably supported in said internal cavity of said housing for rotation about a first rotary axis and configured to interconnect the powertrain to the first driveline for transmitting drive torque to a first set of wheels to establish a two-wheel drive mode;

a second shaft rotatably supported in said internal cavity of said housing for rotation about a second rotary axis and configured for connection to the second driveline;

a transfer assembly drivingly coupled to said second shaft and including a first transfer component rotatably supported on said first shaft, a second transfer component fixed for rotation with said second shaft, and a third transfer component rotatively connecting said first transfer component for rotation with said second transfer component;

a transfer clutch selectively operable in a released mode to uncouple said first transfer component from said first shaft and in an engaged mode to couple said first transfer component to said first shaft for transmitting drive torque through said transfer assembly and said second shaft to the second driveline for driving a second set of wheels and establishing a four-wheel drive mode;

a first rotary seal disposed between said housing and said first transfer component for delineating said internal cavity into a first lubricant sump associated with said first axis and a second lubricant sump associated with said second axis;
and a second rotary seal disposed between said housing and first transfer component for further delineating said internal cavity to define a third lubricant sump associated with said first rotary axis;
wherein said first rotary axis is offset and elevated relative to said second rotary axis such that said first lubricant sump is elevated relative to said second lubricant sump, wherein said transfer clutch is located within said first lubricant sump and said transfer assembly is located within said second lubricant sump, and wherein said third lubricant sump is axially offset relative to said first lubricant sump and is elevated relative to said second lubricant sump.

2. The transfer case of claim 1 wherein said first lubricant sump is in fluid communication with said third lubricant sump via a flow passage therebetween.

3. The transfer case of claim 2 wherein said flow passage between said first and third lubricant sumps is an annular channel defined between said first shaft and said first transfer component, wherein a bearing assembly is disposed in said annular channel and rotatably supports said first transfer component on said first shaft and is lubricated via a flow of lubricant between said first and third lubricant sumps, and wherein said first and second rotary seals provide a fluid seal between said first and third lubricant sumps relative to said second lubricant sump.

4. A transfer case for use in a four-wheel drive motor vehicle having a powertrain and first and second drivelines, the transfer case comprising:
a housing defining an internal cavity;
a first shaft rotatably supported in said internal cavity of said housing for rotation about a first rotary axis and configured to interconnect the powertrain to the first driveline for transmitting drive torque to a first set of wheels to establish a two-wheel drive mode;
a second shaft rotatably supported in said internal cavity of said housing for rotation about a second rotary axis and configured for connection to the second driveline;
a transfer assembly drivingly coupled to said second shaft and including a first transfer component rotatably supported on said first shaft, a second transfer component fixed for rotation with said second shaft, and a third transfer component rotatively connecting said first transfer component for rotation with said second transfer component;
a transfer clutch selectively operable in a released mode to uncouple said first transfer component from said first shaft and in an engaged mode to couple said first transfer component to said first shaft for transmitting drive torque through said transfer assembly and said second shaft to the second driveline for driving a second set of wheels and establishing a four-wheel drive mode; and
a rotary seal arrangement disposed between said housing and said first transfer component for delineating said internal cavity into a first lubricant sump associated with said first axis and a second lubricant sump associated with said second axis;
wherein said first rotary axis is offset and elevated relative to said second rotary axis such that said first lubricant sump is elevated relative to said second lubricant sump, wherein said transfer clutch is located within said first lubricant sump and said transfer assembly is located within said second lubricant sump, wherein lubricant within said second lubricant sump is elevated in response to rotation of said transfer assembly therein and is collected in a collection reservoir, wherein said collected lubricant in said collection reservoir is fed into said first lubricant sump via an inlet port, and wherein a desired lubricant fill level is maintained in said first lubricant sump via a discharge port located to discharge excess lubricant from said first lubricant sump into said second lubricant sump.

5. A transfer case for use in a four-wheel drive motor vehicle having a powertrain and first and second drivelines, the transfer case comprising:
a housing defining an internal cavity;
a first shaft rotatably supported in said internal cavity of said housing for rotation about a first rotary axis and configured to interconnect the powertrain to the first driveline for transmitting drive torque to a first set of wheels to establish a two-wheel drive mode;
a second shaft rotatably supported in said internal cavity of said housing for rotation about a second rotary axis and configured for connection to the second driveline;
a transfer assembly drivingly coupled to said second shaft and including a first transfer component rotatably supported on said first shaft, a second transfer component fixed for rotation with said second shaft, and a third transfer component rotatively connecting said first transfer component for rotation with said second transfer component;
a transfer clutch selectively operable in a released mode to uncouple said first transfer component from said first shaft and in an engaged mode to couple said first transfer component to said first shaft for transmitting drive torque through said transfer assembly and said second shaft to the second driveline for driving a second set of wheels and establishing a four-wheel drive mode; and
a rotary seal arrangement disposed between said housing and said first transfer component for delineating said internal cavity into a first lubricant sump associated with said first axis and a second lubricant sump associated with said second axis;
wherein said first rotary axis is offset and elevated relative to said second rotary axis such that said first lubricant sump is elevated relative to said second lubricant sump, wherein said transfer clutch is located within said first lubricant sump and said transfer assembly is located within said second lubricant sump, wherein said first transfer component of said transfer assembly is fixed to a tubular stub shaft surrounding said first shaft, wherein said housing defines a first cylindrical rim segment surrounding said transfer clutch and a first portion of said tubular stub shaft, and wherein said rotary seal arrangement includes a first seal unit having a first seal segment secured to said first rim segment of said housing and a second seal segment extending from said first seal segment and engaging said first portion of said tubular stub shaft.

6. The transfer case of claim 5 wherein said housing defines a second cylindrical rim segment surrounding said first shaft and a second portion of said tubular stub shaft, and wherein said rotary seal arrangement further includes a second seal unit having a first seal segment secured to said second rim segment of said housing and a second seal segment extending from said first seal segment and engaging said second portion of said tubular stub shaft.

7. The transfer case of claim 6 wherein said first seal unit cooperates with said first rim segment of said housing to define a clutch sump chamber with said first lubricant sump being located within said clutch chamber, wherein said second seal unit cooperates with said second rim segment of said housing to define an inlet sump chamber, wherein a third lubricant sump is located within said inlet sump chamber, said third lubricant sump is axially offset relative to said first lubricant sump and is elevated relative to said second lubricant sump, and wherein a bearing assembly rotatably supporting said first shaft within said second rim segment of said housing is disposed within said third lubricant sump.

8. The transfer case of claim 7 wherein said first lubricant sump is in fluid communication with said third lubricant sump via a flow passage provided between said clutch sump chamber and said inlet sump chamber.

9. The transfer case of claim 8 wherein said flow passage is an annular channel defined between an intermediate portion of said first shaft and said tubular stub shaft surrounding said intermediate portion of said first shaft.

10. A transfer case for use in a four-wheel drive motor vehicle having a powertrain and first and second drivelines, the transfer case comprising:
a housing defining an internal cavity;
a first shaft rotatably supported in said internal cavity of said housing for rotation about a first rotary axis and configured to interconnect the powertrain to the first driveline for transmitting drive torque to a first set of wheels to establish a two-wheel drive mode;
a second shaft rotatably supported in said internal cavity of said housing for rotation about a second rotary axis and configured for connection to the second driveline;
a transfer assembly drivingly coupled to said second shaft and including a first transfer component rotatably supported on said first shaft, a second transfer component fixed for rotation with said second shaft, and a third transfer component rotatively connecting said first transfer component for rotation with said second transfer component;
a transfer clutch selectively operable in a released mode to uncouple said first transfer component from said first shaft and in an engaged mode to couple said first transfer component to said first shaft for transmitting drive torque through said transfer assembly and said second shaft to the second driveline for driving a second set of wheels and establishing a four-wheel drive mode; and
a rotary seal arrangement disposed between said housing and said first transfer component for delineating said internal cavity into a first lubricant sump associated with said first axis and a second lubricant sump associated with said second axis;
wherein said first rotary axis is offset and elevated relative to said second rotary axis such that said first lubricant sump is elevated relative to said second lubricant sump, wherein said transfer clutch is located within said first lubricant sump and said transfer assembly is located within said second lubricant sump, wherein said first transfer component is a first sprocket rotatably supported on said first shaft, said second transfer component is a second sprocket fixed to said second shaft, and said third transfer component is a chain drivingly connecting said first and second sprockets.

11. A transfer case for use in a four-wheel drive motor vehicle having a powertrain and first and second drivelines, the transfer case comprising:
a housing defining an internal cavity;
a first shaft rotatably supported in said internal cavity of said housing for rotation about a first rotary axis and configured to interconnect the powertrain to the first driveline for transmitting drive torque to a first set of wheels to establish a two-wheel drive mode;
a second shaft rotatably supported in said internal cavity of said housing for rotation about a second rotary axis and configured for connection to the second driveline;
a transfer assembly drivingly coupled to said second shaft and including a first transfer component rotatably supported on said first shaft, a second transfer component fixed for rotation with said second shaft, and a third transfer component rotatively connecting said first transfer component for rotation with said second transfer component;
a transfer clutch selectively operable in a released mode to uncouple said first transfer component from said first shaft and in an engaged mode to couple said first transfer component to said first shaft for transmitting drive torque through said transfer assembly and said second shaft to the second driveline for driving a second set of wheels and establishing a four-wheel drive mode; and
a rotary seal arrangement disposed between said housing and said first transfer component for delineating said internal cavity into a first lubricant sump associated with said first axis and a second lubricant sump associated with said second axis;
wherein said first rotary axis is offset and elevated relative to said second rotary axis such that said first lubricant sump is elevated relative to said second lubricant sump, wherein said transfer clutch is located within said first lubricant sump and said transfer assembly is located within said second lubricant sump, wherein said transfer clutch includes a first clutch member fixed to said first shaft, a second clutch member fixed to said first transfer component, a clutch pack operably disposed between said first and second clutch members, and a power-operated clutch actuator for variably regulating a clutch engagement force exerted on said clutch pack, and wherein said transfer clutch is operable in its released mode when a minimum clutch engagement force is applied to said clutch pack and is further operable in a fully engaged mode when a maximum clutch engagement force is applied to said clutch pack.

12. The transfer case of claim 11 wherein said power-operated clutch actuator includes a ball ramp unit located with said first lubricant sump.

13. The transfer case of claim 11 wherein said first transfer component includes a sprocket tube rotatably mounted on said first shaft and a first chain sprocket fixed for rotation with said sprocket tube, said second transfer component includes a second chain sprocket fixed for rotation with said second shaft, and said third transfer component includes a power chain encircling and in meshed engagement with said first and second chain sprockets, wherein said second clutch member of said transfer clutch is fixed for rotation with a first end of said sprocket tube, wherein said transfer clutch is located within said first lubricant sump, and wherein said rotary seal arrangement includes a first seal unit extending between said housing and a portion of said sprocket tube located between said first chain sprocket and said second clutch member.

14. The transfer case of claim 13 wherein said rotary seal arrangement further includes a second seal unit extending between said housing and a second end of said sprocket tube for delineating said internal cavity to define a third lubricant sump associated with said first rotary axis, and wherein said third lubricant sump is axially offset relative to said first lubricant sump and is elevated relative to said second lubricant sump.

15. The transfer case of claim 14 wherein a first bearing assembly rotatably supports a first end of said first shaft from said housing and is disposed within said first lubricant sump, wherein a second bearing assembly rotatably supports said sprocket tube on said first shaft and is disposed within a flow channel providing fluid communication between said first and third lubricant sumps, and wherein a third bearing assembly rotatably supports a second end of said first shaft from said housing and is disposed within said third lubricant sump.

16. The transfer case of claim 15 wherein a third seal unit extends between said first end of said first shaft and said housing to cooperate with said first seal unit to define a clutch chamber within which said transfer clutch and said first bearing unit are disposed and within which said first lubricant sump is established, and wherein a fourth seal unit extends between said second end of said first shaft and said housing to define an inlet sump chamber within which said third bearing assembly is disposed and within which said third lubricant sump is established.

\* \* \* \* \*